United States Patent [19]

Moertel

[11] 4,078,280
[45] Mar. 14, 1978

[54] FOLDED TAPE SLIDE FASTENER STRINGER WITH SECURING STITCHES

[75] Inventor: George B. Moertel, Conneautville, Pa.

[73] Assignee: Textron Inc., Providence, R.I.

[21] Appl. No.: 754,944

[22] Filed: Dec. 28, 1976

Related U.S. Application Data

[63] Continuation-in-part of Ser. No. 648,428, Jan. 12, 1976, and Ser. No. 706,351, Jul. 19, 1976, each is a continuation-in-part of Ser. No. 539,642, Jan. 9, 1975, Pat. No. 3,957,802.

[51] Int. Cl.² .............................................. A44B 19/40
[52] U.S. Cl. .............................................. 24/205.16 C
[58] Field of Search ................ 24/205.13 C, 205.16 C

[56] References Cited

U.S. PATENT DOCUMENTS

| | | | |
|---|---|---|---|
| 1,609,487 | 12/1926 | Marinsky | 24/205.16 C |
| 3,430,304 | 3/1969 | Swainson | 24/205.1 C |

Primary Examiner—Bernard A. Gelak
Attorney, Agent, or Firm—O'Brien & Marks

[57] ABSTRACT

Stitching, such as a straight line of stitches or an overedge stitch, secures the opposite halves of a folded tape together adjacent to interconnecting portions of a continuous coupling element encircled by strap portions of the tape defined by slits extending transversely over the folded edge through which head portions of the coupling element protrude.

18 Claims, 22 Drawing Figures

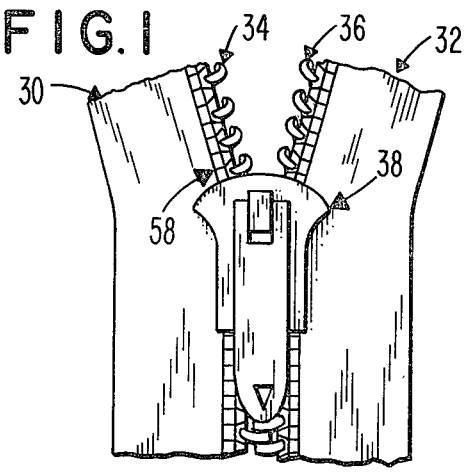
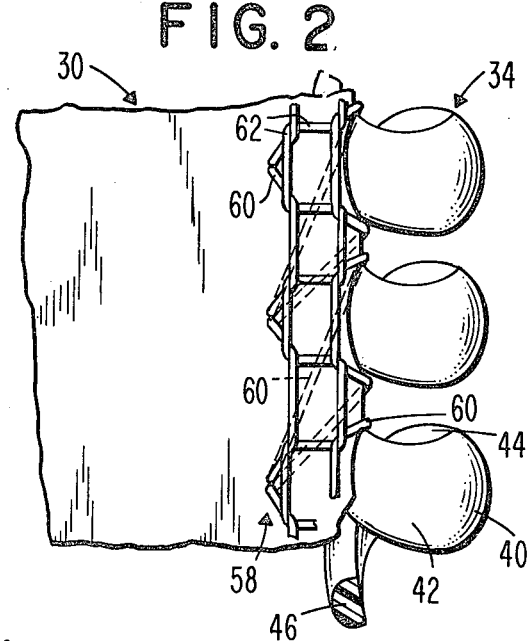
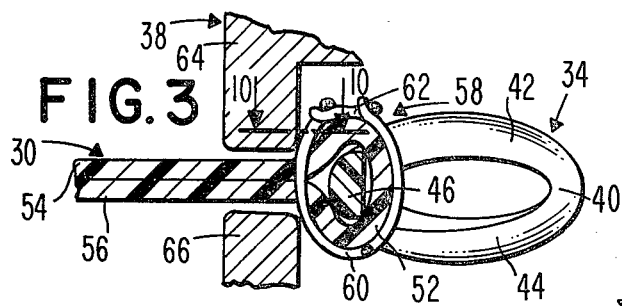
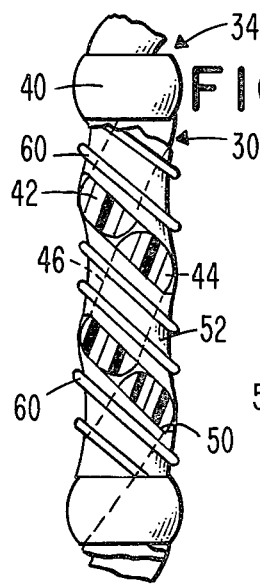
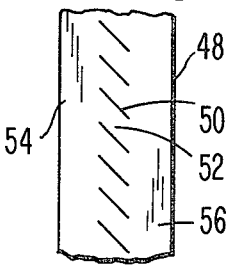
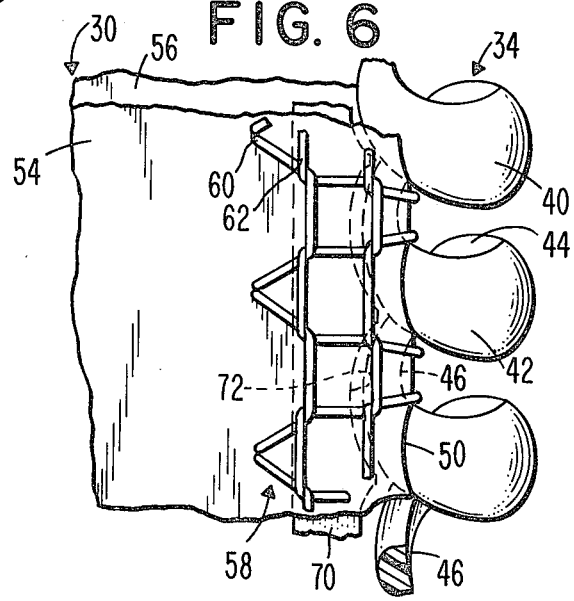
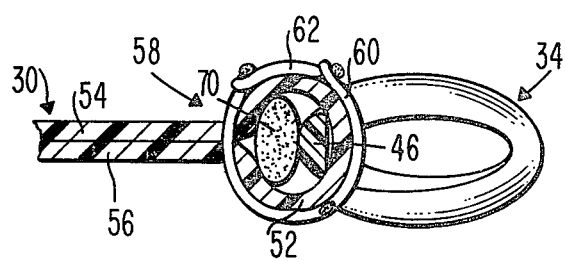
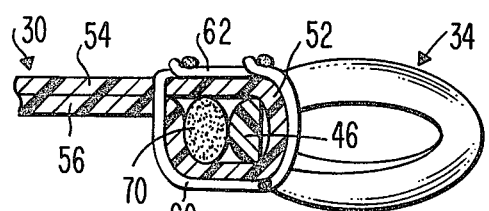

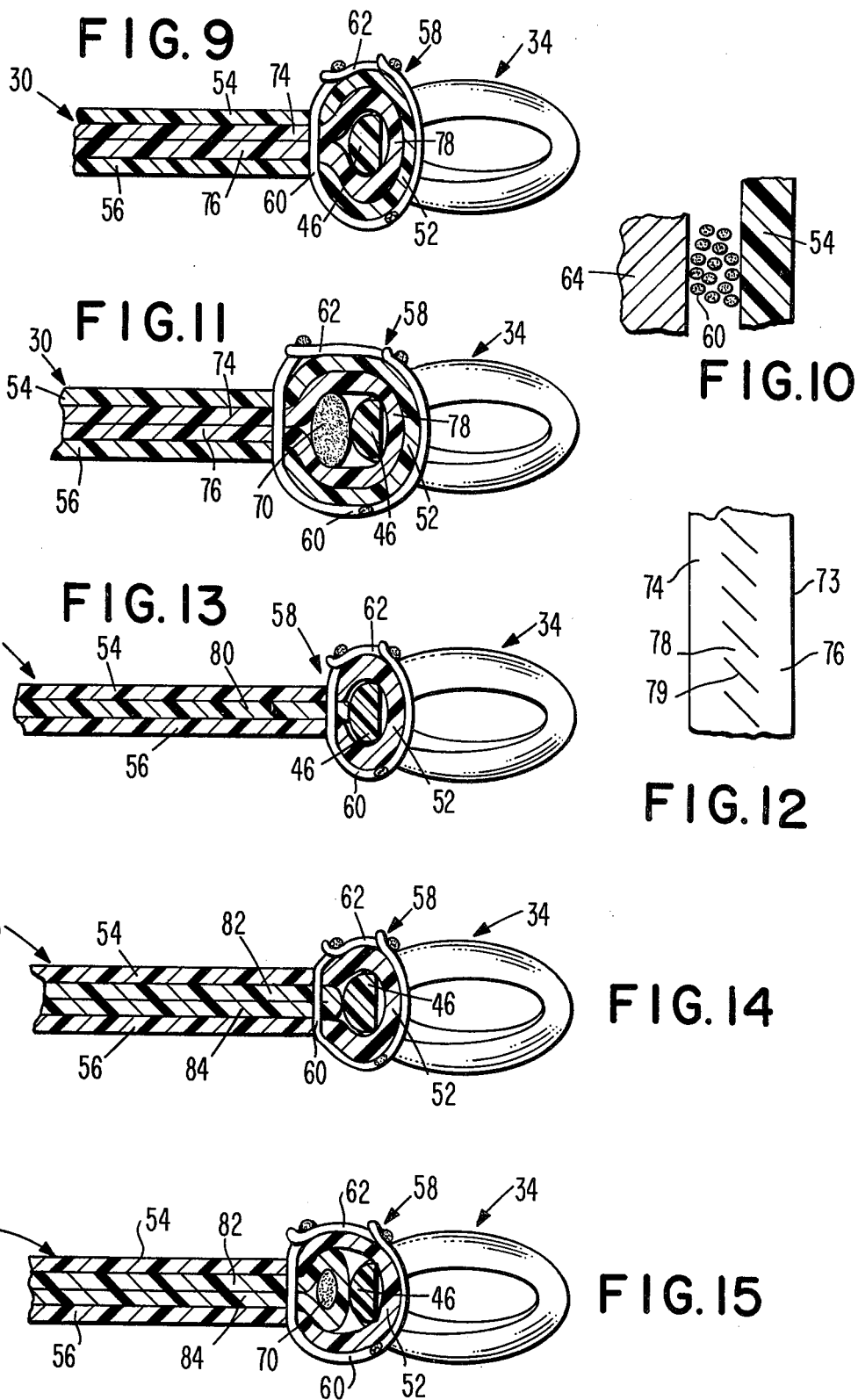

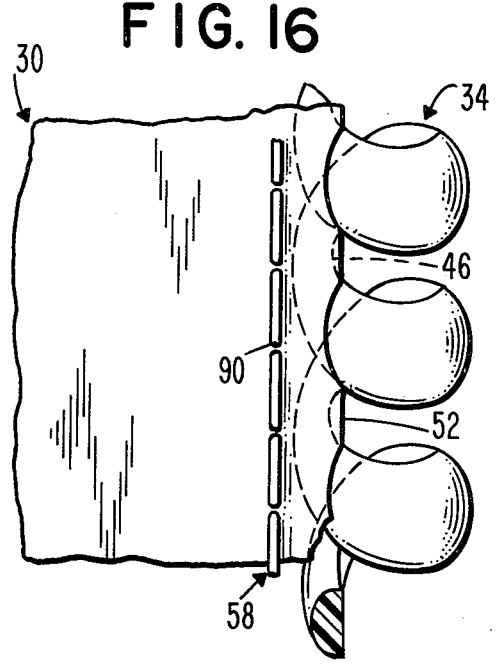
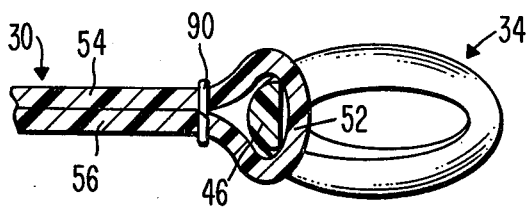
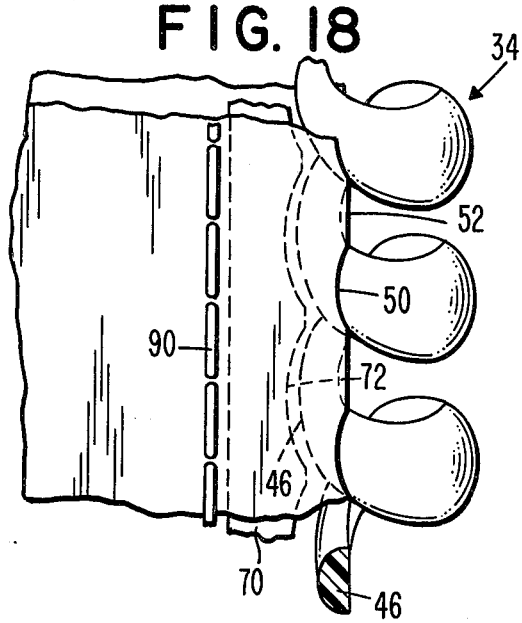
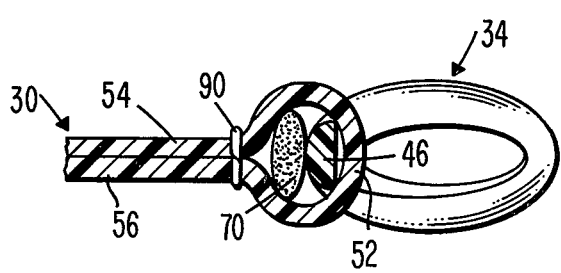
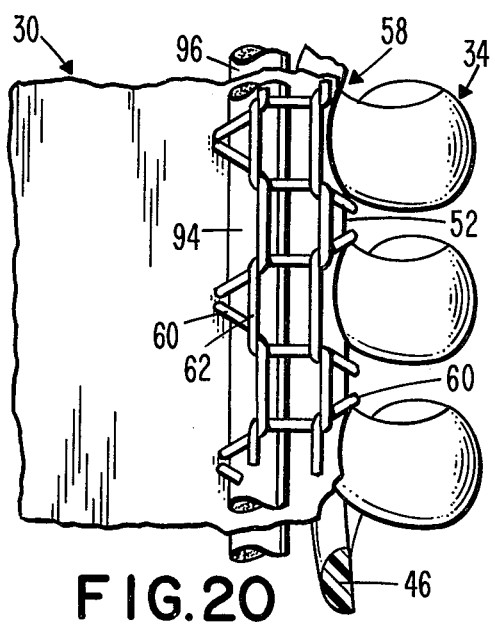
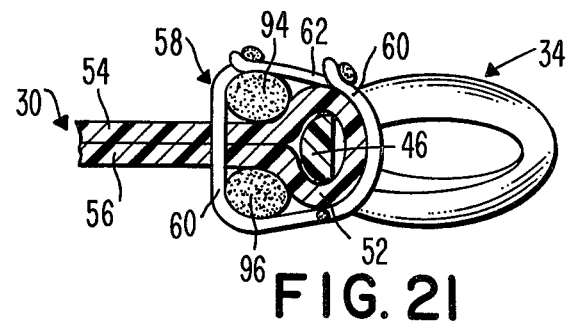
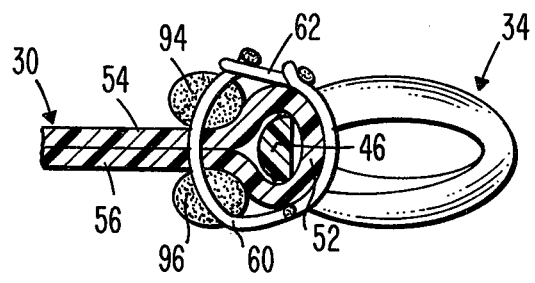

FOLDED TAPE SLIDE FASTENER STRINGER WITH SECURING STITCHES

CROSS-REFERENCE TO RELATED APPLICATION

This application is a continuation-in-part of my prior copending U.S. application Ser. Nos. 648,428 filed Jan. 12, 1976 and Ser. No. 706,351 filed July 19, 1976 which in turn were continuation-in-parts of my U.S. application Ser. No. 539,642 filed Jan. 9, 1975 now U.S. Pat. No. 3,957,802 issued Aug. 24, 1976; such copending applications and patent being expressly incorporated herein by reference.

BACKGROUND OF THE INVENTION

1. Field of the Invention

This invention relates to slide fasteners having continuous coupling elements secured within folded edges of support tapes with head portions of the continuous coupling elements protruding through openings in the folded edges.

2. Description of the Prior Art

In commercially available slide fasteners utilizing continuous coupling elements such as spiral coupling elements secured to inner edges of carrier or support tapes, the continuous coupling elements are generally secured to the inner edges of the tapes by sewing or weaving the coupling elements to the tapes. The prior art, as exemplified in U.S. Pat. Nos. 1,557,303; 1,609,487; 1,933,290; 1,937,297; 2,018,099; 2,296,880; 3,430,304 and 3,517,422 and French Pat. No. 1,135,269 discloses a number of slide fasteners having continuous coupling elements secured within folded edges of a support tape wherein head portions of the coupling elements protrude from slots extending perpendicular across the folded edge of the support member. Additionally French Pat. No. 452,527 discloses a fastener with a spiral secured by strips of material formed at an angle across a folded edge of the strip. The commercial employment of slide fasteners with the continuous coupling elements secured in the fold of a tape has not been significant compared to fasteners with the coupling elements woven or sewn to textile tapes despite the obvious cost advance of low cost strips such as synthetic polymer or paper strips compared to woven textile tapes. This failure can be attribed to deficiencies in the prior art, such as breakage or tearing of the strap portions of the support member, instability of the coupling element, inability to withstand high slider forces, excessive difficulty in slider operation, etc. Various other types of slide fasteners have been disclosed, such as U.S. Pat. No. 3,474,505 wherein a helically wound element is secured in abutting relationship to one edge of a tape by two threads, one of which extends through the tape and around the support portions of the element; also this U.S. Pat. No. 3,474,505 discloses a pair of cords on the opposite sides of the tape edge secured by the two threads to form a bead.

SUMMARY OF THE INVENTION

The invention is summarized in a stringer for a slide fastener including a support member including a strip longitudinally folded at one edge and having a longitudinal row of spaced transverse slits defining looped strap portions on the one edge, the support member having opposite overlaying strip portions interconnected by the loop strap portions; a continuous coupling element having successive sections each including a head portion extending from a corresponding slit of slits in the one edge of the support member, and an interconnecting portion extending through a corresponding looped strap portion of the strap portions of the support member and joined with an adjacent section; and overedge stitch means on one edge of the support member extending around the interconnecting portions and securing the opposite strip portions together adjacent the coupling element.

An object of the invention is to construct a low cost and reliable slide fastener having a continuous coupling element in a folded edge of a carrier tape with increased strength and stability.

Another object of the invention is to provide for easier operation of a slider of a slide fastener employing a continuous coupling element secured within a fold of a polymer support tape.

It is also an object of the invention to prevent a continuous coupling element secured within a fold of a slide fastener tape being pushed within the fold by the slider during operation of the slider.

Another object of the invention is to construct a slide fastener having folded polymer carrier tapes with a much improved ability to withstand abuse.

One advantage of the invention is that stitches securing the opposite folded portions of a carrier tape together strengthens the slide fastener as well as distributing local stresses throughout the slide fastener.

Another advantage is that an overedge stitch substantially reinforces the strap portions of the folded tape securing the coupling element as well as resulting in easier operation of the slider.

One feature of the invention is that overedge stitching means includes threads passing over a folded edge of a carrier tape at an oblique angle in the same direction as the oblique angle of strap portions formed in the folded edge to reinforce the securement of a coupling element within the folded edge.

Another feature of the invention to provide an inner tape between the folded halves of polymer support tape to provide reinforcement of the support tape.

Still another feature of the invention is to provide both inner and outer folded polymer tapes for supporting a coupling element in the folded edge thereof.

Other objects, advantages and features of the invention will be apparent from the following description of the preferred embodiment taken in conjunction with the accompanying drawings.

BRIEF DESCRIPTION OF THE DRAWINGS

FIG. 1 is a plan view of a slide fastener constructed in accordance with the invention.

FIG. 2 is an enlarged plan view of a broken-away portion of one stringer of the fastener of FIG. 1.

FIG. 3 is a cross section view of the slide fastener stringer portion of FIG. 2.

FIG. 4 is a side view of the stringer portion of FIGS. 2 and 3 with parts broken away.

FIG. 5 is a plan view of a section of tape used in forming the stringer of FIGS. 2, 3 and 4.

FIG. 6 is an enlarged plan view of a broken-away portion of a modified slide fastener stringer.

FIG. 7 is a cross section view of the modified stringer portion of FIG. 6.

FIG. 8 is a cross section view similar to FIG. 7 of a variation of the modification of FIGS. 6 and 7.

FIG. 9 is a cross section view of a broken-away portion of a second modification of the slide fastener stringer.

FIG. 10 is an enlarged cross section view taken along line 10—10 of FIG. 3.

FIG. 11 is a cross section view of a broken-away portion of a variation of the modification of FIG. 9.

FIG. 12 is a plan view of a section of an inner strip of the modification of FIG. 9.

FIG. 13 is a cross section view of a broken-away portion of a third modification of the slide fastener stringer.

FIG. 14 is a cross section view of a broken-away portion of a variation of the modification of FIG. 13.

FIG. 15 is a cross section view of a broken-away portion of another variation of the modification of FIG. 13.

FIG. 16 is an enlarged plan view of a broken-away portion of a fourth modification of the slide fastener stringer.

FIG. 17 is a cross section view of the slide fastener stringer portion of FIG. 16.

FIG. 18 is an enlarged plan view of a variation of the stringer portion of FIGS. 16 and 17.

FIG. 19 is a cross section view of the variation shown in FIG. 18.

FIG. 20 is an enlarged plan view of a broken-away portion of a fifth modification of the slide fastener stringer.

FIG. 21 is a cross section view of the stringer portion of FIG. 20.

FIG. 22 is a cross section view of a variation of the modified stringer portion shown in FIGS. 20 and 21.

DESCRIPTION OF THE PREFERRED EMBODIMENTS

As illustrated in FIG. 1, the invention is embodied in a slide fastener having planarly disposed support members, such as a carrier tapes indicated generally at 30 and 32, and having continuous coupling elements, such as spiral coupling elements indicated generally at 34 and 36, along with a slider indicated generally at 38 which is slidable along the coupling elements 34 and 36 for opening and closing the slide fastener. The tape 30 and the coupling element 34, as viewed in FIG. 1, form a left stringer for the slide fastener while the tape 32 and the coupling element 36 form a right stringer. The right stringer is substantially a mirror image of the left stringer; therefore only the left stringer will be described in detail hereafter.

As shown in FIGS. 2, 3 and 4, the spiral coupling element 34 is formed into successive convolutions or sections from a continuous filament, such as a nylon or polyester filament, which has an oblong cross section, such as a D-shape cross section. Each convolution of the coupling element 34 includes a head portion 40, an upper leg portion 42 extending from the upper side of the head portion 40, a lower leg portion 44 extending from the lower side of the head portion 40, and a connecting or heel portion 46 interconnecting the lower leg portion 44 to the upper leg portion of an adjoining convolution.

The support member 30 is formed from a strip 48, FIG. 5, which has a longitudinal row of transverse slits 50 formed in an intermediate section thereof to define strap portions 52 extending between opposite strip portions or halves 54 and 56 of the strip 48. As shown in FIGS. 2, 3 and 4, the strip is longitudinally folded along the row of transverse slits with the coupling element 34 assembled inside of the fold such that the head portions 40 and the leg portions 42 and 44 protrude from the respective slits 50 with the interconnecting portions 46 extending within the fold beneath of the strap portions 52. The strip 48 forming the support member 30 is preferable a low cost material such as a polymer resin, paper, or the like.

The slits 50 are formed at an oblique angle of the folded edge of the tape 30 so that the leg portions 42 and 44 of each section extend from opposite halves of the respective slit 50 at points spaced longitudinally along the folded edges of the tape 30. The monofilament forming the spiral coupling element 34 is twisted such that the longest dimensions of the oblong cross section of each pair of leg portions 42 and 44 are substantially aligned with each other and with the slit 50 where the leg portions 42 and 44 exit from the slit 50. The strap portions 52 are substantially wider than slits 50 and extend generally perpendicular to the interconnecting portions 46 at an oblique angle to the folded edge of the tape 30.

Stitching means indicated generally at 58 is formed through the opposite folded halves 54 and 56 of the tape 30 adjacent to the interconnecting portions 46 of the coupling elements 34. The stitching means 58 may be any conventional stitch such as an overedge stitch formed from two threads 60 and 62 with the thread 60 passing through the strip halves 54 and 56 and around the interconnecting portion 46. The thread 60, where extending over the interconnecting portion 46, extends at an oblique angle to the folded edge of the tape 30 at about the same oblique angle that the strap portion 52 forms with the edge of the tape. The stitching means 58 can be formed through the tape halves 54 and 56 adjacent to the interconnecting portion 46 from about the middle of the tape 30 to as close as possible to the interconnecting portion 46; adjacent positions contiguous the bead formed in the folded edge of the tape by the connecting portions 46 are preferred.

The stitching means 58 securely joins the tape halves 54 and 56 together adjacent to the coupling element 34 which prevents withdrawal of the coil 34 through the slots 50 in between the tape halves by the action of the slider 38 engaging the head portions 40. With the stitch means 58 joining the tape halves 54 and 56 contiguous the bead of the tape 30 containing the interconnecting portions 46, the stitches greatly improve the performance of the slide fastener by distributing local stresses more broadly throughout the fastener body and reinforcing the longitudinal stability of coupling element. For the overedge stitching the thread 60 passing over the interconnecting portions 46 substantially reinforces the strap portions 52, thereby reducing any chance that the strap portions 52 will be torn.

Additionally, the overedge stitches offer an additional advantage in that they make operation of the slider 38 easier, particularly for slide fasteners with synthetic polymer resin tapes. As illustrated in FIG. 3 the slider flanges 64 and 66 engage the thread 60 as the slider 38 is moved in the slide fastener. The thread 60 is formed from a plurality of fibers, FIG. 10, which as the slider flanges move tend to roll making the operation of the slider easier.

In a modification shown in FIGS. 6 and 7, a cord 70 is disposed within the bead at the folded edge of the tape 30 engaging the outside of the curvatures of the interconnecting portions 46 of the coupling element 34.

Preferably the cord 70 is formed from a resilient material such as a textile thus deforming to form suitable seats 72 for the heel portions 46. The cord 70 is also held within the fold by the stitching means 58 with the thread 60 passing through the folded halves adjacent the cord 70 and connecting portions 46. The cord 70 adds to the stability of the coupling element 34 and allows the strap portions 52 to more securely hold the heel portions 46 to the tape 30 due to the resilience of the cord 70.

As illustrated in FIG. 8 a variation of the stringer with an internal cord 70 has the planar portion of tape 30 offset and in alignment with the top side of the bead and the coupling element 34. Thus the top surface of the slide fastener is relatively smooth and does not have any beads protruding upward therefrom.

In a second modification as shown in FIG. 9 of the slide fastener, the support member 30 includes an inner strip or layer within the folded outer strip. The inner strip 73 as shown in FIG. 12 includes opposite longitudinal halves or folded portions 74 and 76 connected by strap portions 78 between slits 79 substantially the same as the folded portions 54 and 56 and the strap portions 52 between the slits 50 of the outer strip 48, FIG. 5. The slits in the inner and outer strips are aligned to receive the pairs of leg portions of the coupling element 34 in the same manner as the leg portions 42 and 44 are received in the slits 50 of the stringer portion of FIGS. 2-4. The strap portions 78 and 52 of both the inner and outer strips extend over the interconnecting portions 46 of the coupling element 34, and the folded halves 74 and 76 of the inner strip are secured together with the outer halves 54 and 56 engaged on the outside thereof by the overedge stitching 58. The thread 60 passes through all four layers 54, 74, 76 and 56 and on the outside of the outer strap portion 52 around the interconnecting portions 46. The double layer strip of synthetic polymer resin or the like forming the support member 30 of FIG. 9 has increased strength without greatly reducing flexibility; in single strips with increased thickness to increase strength, flexibility is greatly reduced.

In a variation shown in FIG. 11 of the double thickness strip forming the support member 30, the cord 70 is included in the folded edge engaging the heels 46 of the coupling element 34 in the manner of the modification of FIGS. 6 and 7.

A third modification shown in FIG. 13 has strip portions 54 and 56 of the support member 30 reinforced by a single layer or strip 80 sandwiched between the portions 54 and 56. The strip 80, of synthetic polymer resin or the like, on the edge adjacent the coupling element 34 abuts the heel portions 46 of the coupling element 34 and has the thread 60 of the overedge stitching 58 passing therethrough to secure the strip 80. Variations, illustrated in FIGS. 14 and 15, of the stringer with reinforced strip portions include folded halves 82 and 84 of a longitudinally folded strip of similar material secured by the stitching 58 between the outer strip portions 54 and 56. The folded edge of the inner strip runs along or engages the heel portions 46 of the coupling element 34. In FIG. 15, the cord 70 is included within the folded edge of the inner strip surrounded by the threads 60 and 62; in this variation the cord 70 increases the size of the bead and reinforces the security of the stitching 58 since the cord 70 distributes stress from the thread 60 along the folded edge of the inner tape to prevent tearing of the thread 60 from the support member 30.

In a fourth modification shown in FIGS. 16 and 17 of the slide fastener stringer, the strip portions 54 and 56 are secured together by a straight line of stitches 90 running adjacent to the bead formed by the heel portions 46 of the coupling element 34 within the folded edge of the strip. The straight line of stitches 90 reinforces the longitudinal stability of the slide fastener stringer as well as preventing the coupling element 34 from being pushed through the slots 50 into the center between the strip portions 54 and 56. In a variation illustrated in FIGS. 18 and 19, the cord 70 is included within the bead engaging the heel portions 46 and is secured by the stitches 90.

A still further modification of the slider fastener stringer as shown in FIGS. 20-22, has external textile cords 94 and 96 extending longitudinally along the outside surfaces of the strip portions 54 and 56 contiguous to the bead formed in the folded edge of the tape by the interconnecting portions 46 of the coupling element. The stitching means 58 secures the external cords 94 and 96 as well as securing the strip portions 54 and 56 together. In FIGS. 20 and 21 the thread 60 passes over the outside of the external cords 94 and 96 while in the variation of FIG. 22 the thread 60 passes through the cords 94 and 96. The cords 94 and 96 provide a longitudinal textile bearing surface for the slider flanges resulting in easier slider operation and distributing stress from the slider flanges.

Since the invention is subject to many modifications, variations and changes in detail, it is intended that all matter contained in the foregoing specification or shown in the accompanying drawings be interpreted as illustrative and not in a limiting sense.

What is claimed is:

1. A stringer for a slide fastener comprising
    an elongated support member including a strip longitudinally folded at one edge and having a longitudinal row of spaced transverse slits defining looped strap portions on the one edge, said folded strip having opposite overlaying strip portions interconnected by the looped strap portions;
    a continuous coupling element having successive sections each including a head portion extending from a corresponding slit of the slits in the one edge of the support member, and an interconnecting portion extending through a corresponding looped strap portion of the strap portions of the support member and joined with an adjacent section; and
    overedge stitch means on the one edge of the support member extending around the interconnecting portions and securing the opposite strip portions together adjacent the coupling element.

2. A stringer as claimed in claim 1 wherein the strip is made of a material selected from the the group consisting of polymer resin and paper.

3. A stringer as claimed in claim 1 wherein the continuous coupling element is a spiral coupling element formed from a continuous filament into successive convolutions, each convolution having a head portion and a pair of leg portions extending from the opposite sides of the head portion through the corresponding respective slit in the one edge, the interconnecting portion interconnecting one of the pair of leg portions to an opposite leg portion of an adjacent convolution; and said slits are formed in the support member of an oblique angle such that opposite halves of each slit receive the respective leg portions of each pair of leg portions at respective longitudinally spaced points on the one edge of the support member.

4. A stringer as claimed in claim 3 wherein the overedge stitch means includes thread means extending at an oblique angle to the one edge around the interconnecting portions in the same general direction as the oblique angle formed by the slits in the support member.

5. A stringer as claimed in claim 1 including internal cord means extending longitudinally within the fold at the one edge of the strip and within the overedge stitch means.

6. A stringer as claimed in claim 1 wherein the longitudinally folded strip is an outer strip, and the support member also includes an inner reinforcing strip extending longitudinally between the opposite overlaying strip portions of the outer strip and secured therein by the overedge stitch means.

7. A stringer for a slide fastener comprising
a carrier tape including a longitudinally folded strip and having a plurality of spaced slits in the strip transversely over the folded edge defining looped strap portions extending over the folded edge between opposite overlaying strip portions of the tape;
a spiral coupling element formed from a continuous filament of oblong cross section and having a plurality of successive convolutions each including a head portion, a pair of leg portions extending form opposite sides of the head portions into a respective slit of the plurality of slits, and a heel portion extending through a respective one of the looped strap portions and joined with an adjoining convolution;
said slits being formed in the carrier tape at an oblique angle to the folded edge; said filament being twisted so that the longest dimensions of the cross sections of the pair of leg portions in each convolution are aligned with each other and with the respective slits; and
stitch means securing the opposite strip portions together adjacent the coupling elements.

8. A stringer as claimed in claim 7 and further including internal cord means within the folded edge of the tape engaging the heel portions of the spiral coupling element.

9. A stringer as claimed in claim 8 wherein the opposite strip portions are offset to be in alignment with one side of a bead formed by the interconnecting portions within the folded edge of the tape.

10. A stringer as claimed in claim 7 wherein the stitch means includes overedge stitching extending around the interconnecting portions.

11. A stringer as claimed in claim 10 including external cord means secured by the overedge stitching against the bead formed by the interconnecting portions in the one edge of the tape.

12. A stringer as claimed in claim 7 including an inner reinforcing strip extending longitudinally between the opposite overlaying strip portions of the carrier tape and secured therein by the stitch means.

13. A stringer for a slide fastener comprising
an elongated support member including inner and outer strips both longitudinally folded with the inner folded strip extending inside the folded overlaying portions of the outer strip;
said outer strip having a longitudinal row of spaced transverse slits defining looped strap portions extending over the folded edge of the outer strip between the folded overlaying portions of the outer strip;
a continuous coupling element having successive sections each including a head portion extending form a corresponding slit of the slits in the folded edge of the outer strip, and an interconnecting portion extending through a corresponding looped strap portion of the strap portions of the outer strip and joined with an adjoining section; and
means securing the inner and outer folded strip portions together.

14. A stringer as claimed in claim 13 wherein the inner strip also has a longitudinal row of spaced transverse slits defining looped strap portions extending over the folded edge of the inner strip between the folded overlaying portions of the inner strip, said head portions of the coupling element also extending from the corresponding slits of the inner strip, and said looped strap portions of the inner strip also extending around the corresponding interconnecting portions of the coupling element.

15. A stringer as claimed in claim 13 including internal cord means extending longitudinally within the folded edge of the inner strip.

16. A stringer as claimed in claim 14 including internal cord means extending longitudinally within the folded edge of the inner strip and wherein the cord means engages the interconnecting portions of the coupling element.

17. A stringer as claimed in claim 15 wherein the folded edge of the inner strip engages the interconnecting portions of the coupling element.

18. A stringer as claimed in claim 15 wherein the inner and outer strips are synthetic polymer strips.

* * * * *